United States Patent [19]

Watanabe

[11] Patent Number: 4,621,333
[45] Date of Patent: Nov. 4, 1986

[54] METHOD AND APPARATUS FOR CONTROLLING A ROBOT TO PERFORM WEAVING-LIKE MOTION

[75] Inventor: Yuji Watanabe, Aichi, Japan

[73] Assignee: Mitsubishi Denki Kabushiki Kaisha, Tokyo, Japan

[21] Appl. No.: 645,966

[22] Filed: Aug. 31, 1984

[30] Foreign Application Priority Data

Aug. 31, 1983 [JP] Japan ............... 58-159224
Aug. 31, 1983 [JP] Japan ............... 58-159225

[51] Int. Cl.$^4$ .................. G05B 19/42; B23K 9/02
[52] U.S. Cl. .................. 364/513; 364/191;
318/574; 219/125.12; 901/42
[58] Field of Search ............ 364/191, 192, 188, 189,
364/513; 318/573, 574; 219/125.1, 125.11,
125.12; 901/42

[56] References Cited

U.S. PATENT DOCUMENTS 4,150,329  4/1979  Dahlstrom ............... 318/574
4,445,184  4/1984  Noguchi ............... 364/513
4,495,588  1/1985  Nio et al. ............... 364/513
4,538,233  8/1985  Resnick et al. ............... 364/513

FOREIGN PATENT DOCUMENTS 0076498  4/1983  European Pat. Off. ............ 364/513

Primary Examiner—Jerry Smith
Assistant Examiner—Allen MacDonald
Attorney, Agent, or Firm—Sughrue, Mion, Zinn, Macpeak & Seas

[57] ABSTRACT

A method for effecting a weaving-like movement of a hand of an industrial robot, which hand is moved along a principle line while undergoing the weaving-like movement with respect to the principle line. Reference weaving-like pattern information stored as coordinate values in a predetermined reference coordinate system is transformed into actual displacements of the hand with respect to an actual moving direction thereof according to a hand attitude vector and a hand moving direction vector.

5 Claims, 16 Drawing Figures

FIG. 5A PRIOR ART
FIG. 5B PRIOR ART
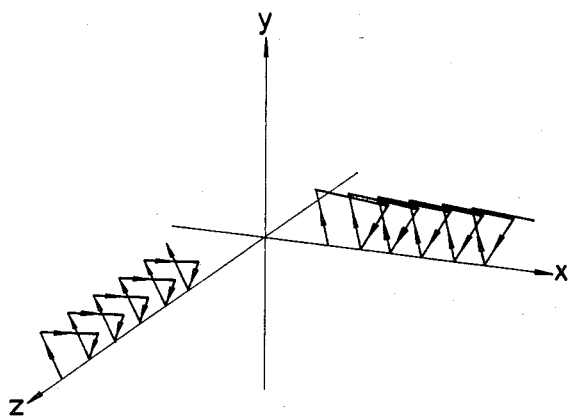
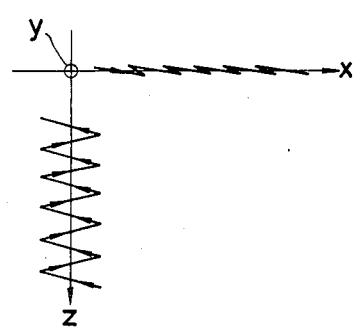
FIG. 9A
FIG. 9B
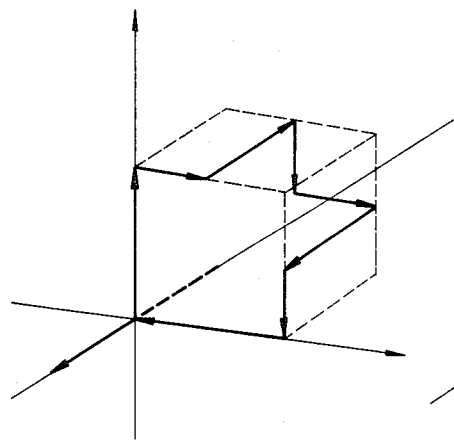
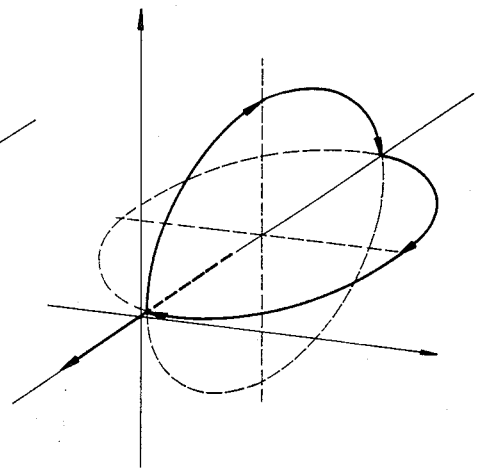
FIG. 10A
FIG. 10B
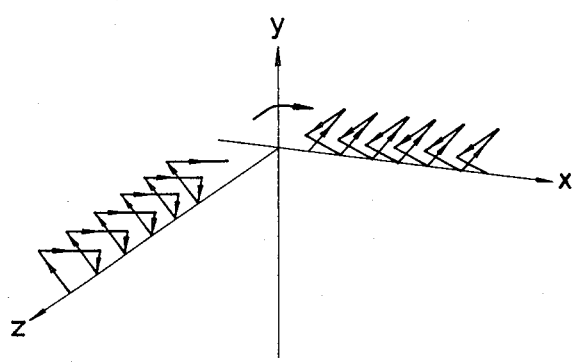
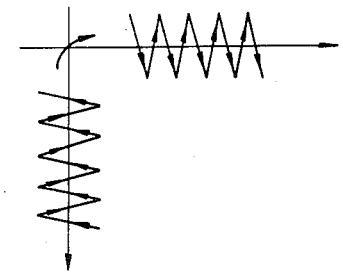

METHOD AND APPARATUS FOR CONTROLLING A ROBOT TO PERFORM WEAVING-LIKE MOTION

BACKGROUND OF THE INVENTION

The present invention relates to a teaching method for an industrial robot and an apparatus for performing the same, and particularly, to such a method and apparatus for effecting a weaving-like movement of a designated pattern with a hand of an industrial robot such as a welding robot. That is, the hand undergoes a subordinate weaving-like movement while moving in a main direction.

For welding thick workpieces or workpieces disposed with a gap therebetween, it is necessary to cause the torch to undergo a back-and-forth weaving-like movement with respect to the workpieces. That is, in order to increase the amount of welding material deposited, it is necessary to cause the torch to undergo a certain lateral motion with respect to a principle welding line during movement of the torch along the principle welding line.

A method of performing such a weaving-like movement which has been utilized heretofore is shown conceptionally in FIG. 1. In FIG. 1, a pair of auxiliary points 4 and 5 are defined on either side of a principle welding line 3 defined by a starting point 1 and a terminating point 2. The auxiliary point 4 is located in a plane orthogonal to the principle welding line 3, at a distance of $d_1$ from the line 3, and the auxiliary point 5 is located in a plane orthogonal to the principle welding line 3. The latter plane forms a certain angle with respect to the plane including the point 4 and is spaced at a distance of $d_2$ from the line 3. The torch undergoes a weaving-like subordinate movement, at a constant speed in the planes so defined with a stroke length which is equal to the sum of the distances $d_1$ and $d_2$, while moving along the principle line 3. The torch first moves from the starting point 1 of the principle line 3 to a point 5a along a line defined by a composite vector of a vector pointing towards the terminating point 2 of the principle line 3 and a vector pointing towards the auxiliary point 5. The torch then moves to a point 1a along a line defined by a composite vector of a vector pointing towards the point 2 and a vector pointing towards the principle line 3. Continuing in this manner, the torch passes through the points 4a, 1b, 5b, 1c, 4b, 1d, etc. in succession, while a welding arc is maintained.

FIG. 2 shows a block diagram of a conventional welding robot which performs such a weaving-like movement. A welding line memory 6 stores the starting point and the terminating point. An interpolator 7 functions to calculate successive points between the starting point and the terminating point, and an auxiliary point memory 8 stores the auxiliary points. A displacement calculator 9 calculates the displacement of the torch from the principle welding line 3, and the output of the displacement calculator 9 is added by an adder 10 to the output of the interpolator 7. A rectangular coordinate value from an output terminal of the adder 10 is converted by an actuator output converter 11 into an actuator output. A welding robot 12 is actuated by the output of the converter 11 to control a hand holding a torch 13. The contents of the welding line memory 6 and the auxiliary point memory 8 are determined by teaching. The displacement calculator 9 is supplied with a weaving pattern vector $\vec{W}$ from the auxiliary point memory 8, a velocity v and a time t, and operates to calculate a displacement $\vec{w}$ according to the following equation: (see also FIG. 4)

$$\vec{w} = \frac{vt}{|\vec{W}|} \vec{W}.$$

where $0 \leq \frac{vt}{|\vec{W}|} \leq 1$.

A flow chart of the operation of the calculator 9 is shown in FIG. 3.

In FIG. 3, the time t is incremented by a time counter, and $\vec{W}_{next}$ indicates a sequential switching of the vectors $\vec{w_1}$ and $\vec{w_2}$ which extend perpendicularly from the auxiliary points 4 and 5 to the principle line 3, respectively, in the manner of $\vec{w_1}, -\vec{w_1}, \vec{w_2}, -\vec{w_2}, \vec{w_1}, \ldots$.

The adder 10 functions to add a displacement p per unit time with respect to the principle line 3, which is obtained by the interpolator 7, to the displacement w obtained by the displacement calculator 9 to obtain a robot position vector $\vec{r}$.

In the above-described conventional method, it is necessary to store not only a single point for each welding line but also two auxiliary points, and therefore much memory capacity is required. Furthermore, since it is necessary to teach the auxiliary points for every welding line, the teaching operation is very complicated when the number of sections of the principle welding line is very large, for instance, more than about one hundred. In addition, in the conventional method, the weaving-like pattern is limited to a two-dimensional plane. That is, since the conventional system utilizes perpendicular lines from the auxiliary points 4 and 5 to the principle line 3 for the displacement calculation performed by the displacement calculator 9, each single movement of the torch is limited to a plane including the vectors $\vec{w_1}$ and $\vec{w_2}$, that is, to a plane vertical to the principle line 3. In other words, because the conventional system is based on the utilization of the opposite ends of the strokes, it cannot be applied to three-dimensional weaving-like pattern.

U.S. Pat. No. 4,150,329 to Dahlstrom discloses a technique by which a three-dimensional weaving-like pattern can be traced. In Dahlstrom, the weaving-like pattern is defined by relative amounts x, y and z of movement; that is, parallel shifts in a general coordinate transformation are employed. More specifically, a position of a point on the principle welding line is determined to which relative positions are added. This system is satisfactory if the principle welding line is parallel to the z direction. However, if the principle welding line is parallel to, for example, the x direction, the weaving-like pattern may become abnormal.

SUMMARY OF THE INVENTION

The present invention was made in view of the above mentioned drawbacks of the prior art.

An object of the present invention is to provide a method for controlling an industrial robot to undergo a weaving-like movement, and to an apparatus for performing the same, which is capable of defining a weaving-like pattern which can be applied to every moving direction of a robot hand without having to define weaving-like patterns based on any particular direction. This object is achieved by teaching an actual displacement at an arbitrary position, and rotationally parallel-shifting the actual displacement to the coordinate volume of a reference point to store it as a reference patterns.

Another object of the invention is to provide a method for controlling an industrial robot to effect movement in a weaving-like pattern and an apparatus for performing the same which is capable of making more efficient use of the available memory capacity, in which the teaching process is simplified and three-dimensional weaving-like pattern movement is made possible. In accordance with this object, a reference weaving-like pattern is stored as reference point coordinates in a weaving-like pattern memory according to a hand moving direction and a hand attitude to rotate and parallel-shift it.

BRIEF DESCRIPTION OF THE DRAWINGS

FIGS. 5A and 5B illustrate defects of the conventional three-dimensional weaving-like pattern;

FIGS. 9A and 9B show three-dimensional patterns which can be executed with the use of this invention; and FIGS. 10A and 10B are illustrations showing a rotational parallel-shift done according to this invention.

DESCRIPTION OF THE PREFERRED EMBODIMENTS

Figure 1:
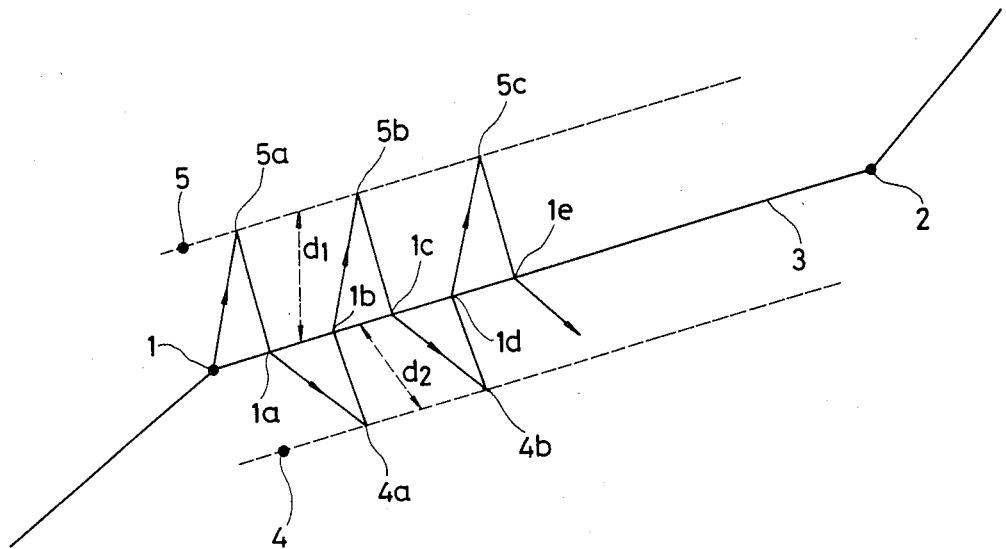
FIG. 1 shows a weaving-like motion of a welding robot.
Figure 2:
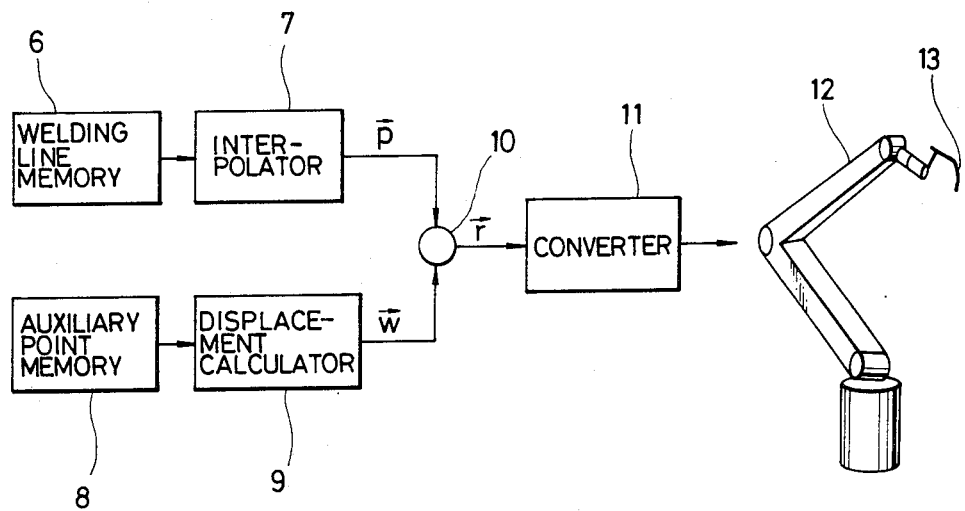
FIG. 2 is a block diagram of a conventional apparatus for performing weaving-like motion with a conventional welding robot.
Figure 3:
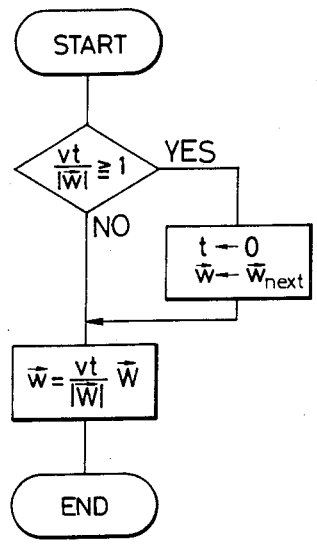
FIG. 3 is a flowchart showing an operation performed by a displacement calculator 9 in FIG. 2.
Figure 4:
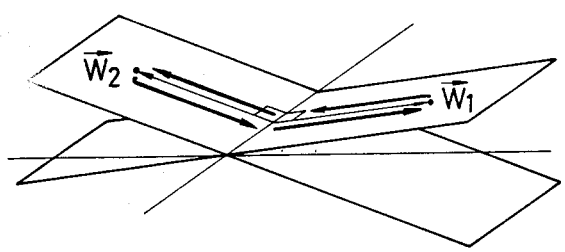
FIG. 4 shows conventional weaving-like pattern vectors.

A preferred embodiment of the present invention will be described with reference to FIGS. 6 and 7A to 7D, in which elements identified by like reference numerals as those in FIG. 2 are the same.

Figure 6:
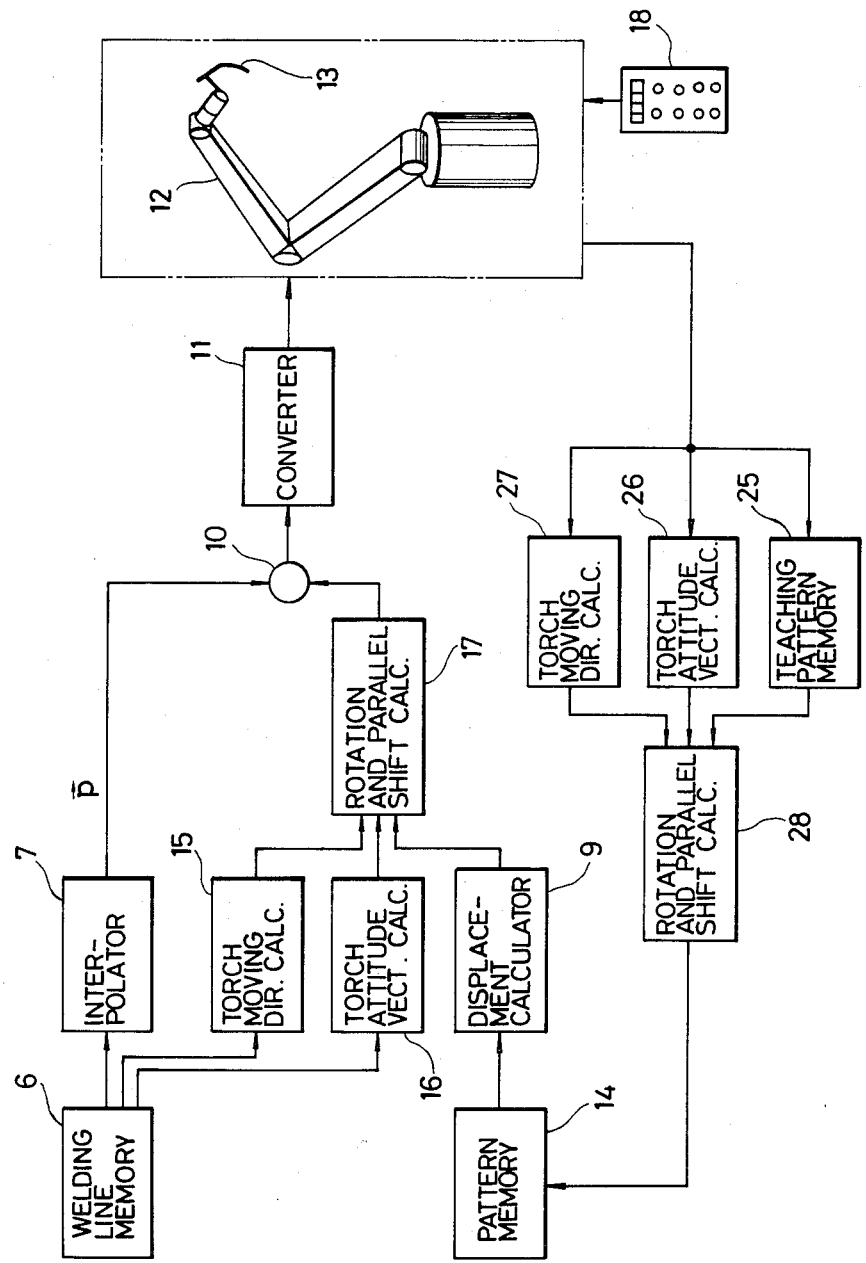
FIG. 6 is a block diagram of a robot control system constructed according to the invention.
Figure 7:
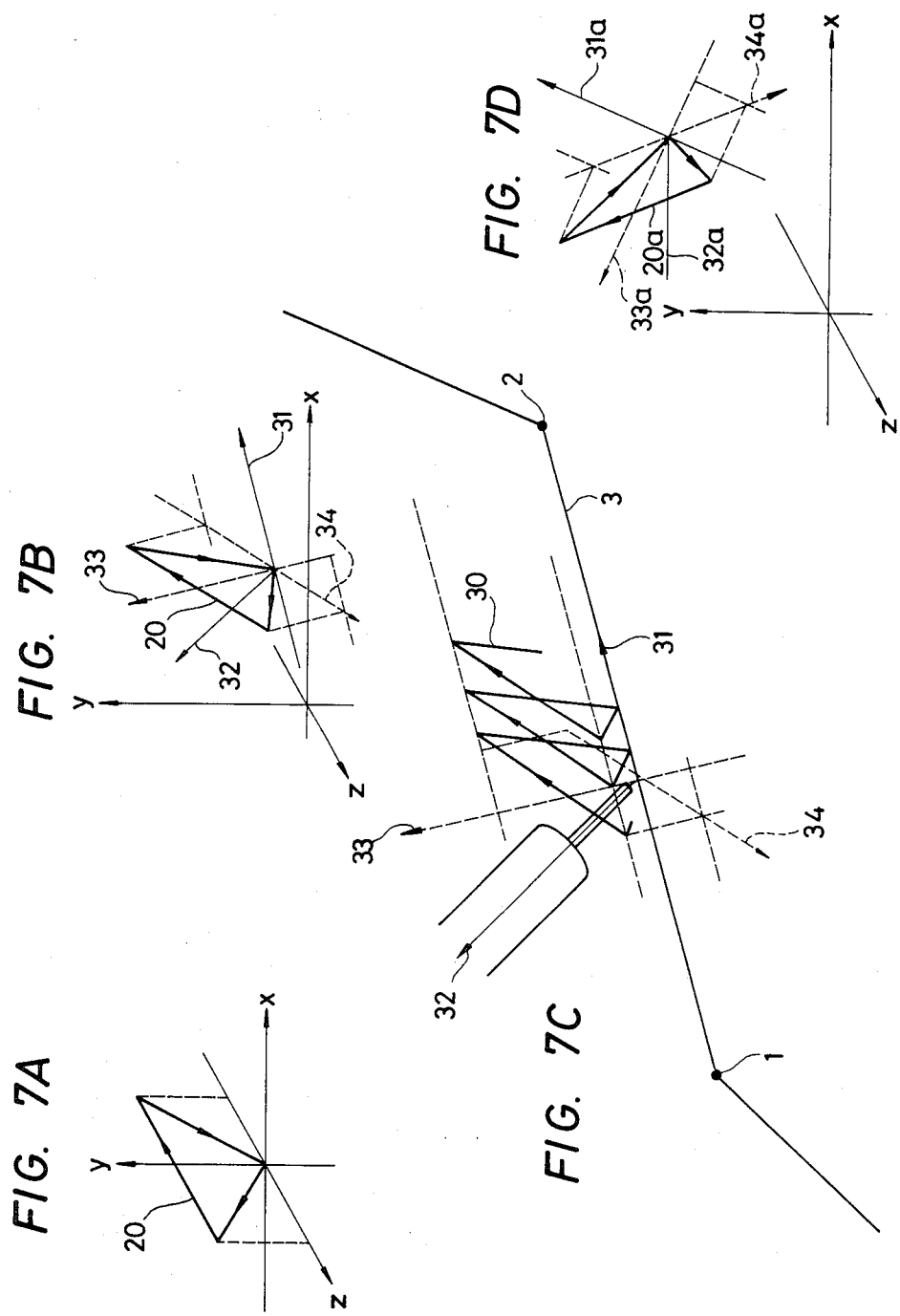
FIG. 7A is a diagram showing pattern information stored in a memory.
FIG. 7B is a diagram showing information resulting from a rotation and parallel-shift of the pattern information in FIG. 7A, according to which an actual weaving-like movement along a welding line is achieved.
FIG. 7C illustrates a weaving-like motion of a torch of a welding robot.
FIG. 7D is a diagram showing a weaving pattern taught at an arbitrary position on a welding line.

FIG. 6 is a block diagram showing a preferred embodiment of a robot control system of the present invention, and FIGS. 7A, 7B and 7C are diagrams for explaining, respectively pattern information stored in a weaving-like pattern memory, pattern information obtained by rotation and parallel-shifting of the pattern information stored in the weaving-like pattern memory for effecting weaving-like motion along an actual welding line, and the weaving-like motion of a torch effected according to the pattern information in FIG. 7B. FIG. 7D illustrates pattern information of a weaving-like motion taught at an arbitrary position.

Referring now to FIGS. 6 and 7A, the weaving-like pattern memory 14 stores a weaving-like pattern information vector 20 as x, y and z coordinates of a predetermined reference point. In FIG. 7A, the x axis corresponds to the torch moving direction, and the pattern information vector lies in a plane defined by the y and z axes. A welding line memory 6 is connectd to an interpolator 7, a torch moving direction vector calculator 15, and a torch attitude vector calculator 16. The calculator 15 functions to calculate a vector of the welding line 3 in the direction from a starting point 1 to a termination point 2, and the vector calculator 16 functions to determine the torch orientation. A rotation and parallel shift calculator 17 receives outputs of the vector calculators 15 and 16 and functions to rotate and parallel-shift an output of a displacement calculator 9 in accordance with a torch moving direction vector obtained from the vector direction calculator 15 and the torch attitude vector obtained from the torch attitude vector calculator 16 to thereby determine an actual displacement of the torch from the principle welding line 3, namely, the displacement in the torch moving direction from the point 1 to the point 2. The output of the rotation and parallel-shift calculator 17 is added by an adder 10 to the output of the interpolator 7. The adder 10 is connected to the actuation output converter 11 which directly controls the welding machine 12.

The system further includes a teaching box 18. A teaching pattern memory 25 stores information at various points along an actual weaving-like locus during teaching mode operations. Another torch attitude vector calculator 26 calculate a vector of the torch attitude as taught by the teaching box 18. A torch moving direction vector calculator 27 calculates a vector in the direction from the point 1 to the end point 2 as taught, and a rotation and parallel shift calculator 28 converts the contents of the teaching pattern memory 25 into reference point coordinates (x, y, z) according to the torch attitude vector from the torch attitude vector calculator 26 and the torch moving direction vector from the torch moving direction vector calculator 27. The output of the rotation and parallel shift calculator 28 is stored in the pattern memory 14.

The operation of the system of FIG. 6, particularly, the input/output portion thereof, will be described.

Firstly, the interpolator 7 outputs a point p on an interpolation path from given position $\vec{p_i}$ to $\vec{p_{i+1}}$, taking into account the specified velocity v and time t. The interpolation to be used may be a linear interpolation, an arc interpolation or an articulation interpolation.

The torch moving direction vector calculator 15, supplied with the same parameters $\vec{p_i}$, $\vec{p_{i+1}}$, v and t as the interpolator 7, produces the moving direction at the point $\vec{p}$ on the interpolation path, that is, a differentiated vector $\vec{l}$. The torch attitude vector 16, supplied with the same parameters, produces a torch attitude vector $\vec{t}$ at the point $\vec{p}$. The operation for obtaining $\vec{t}$ from $\vec{p}$ is unique to the particular robot mechanism.

Figure 8:
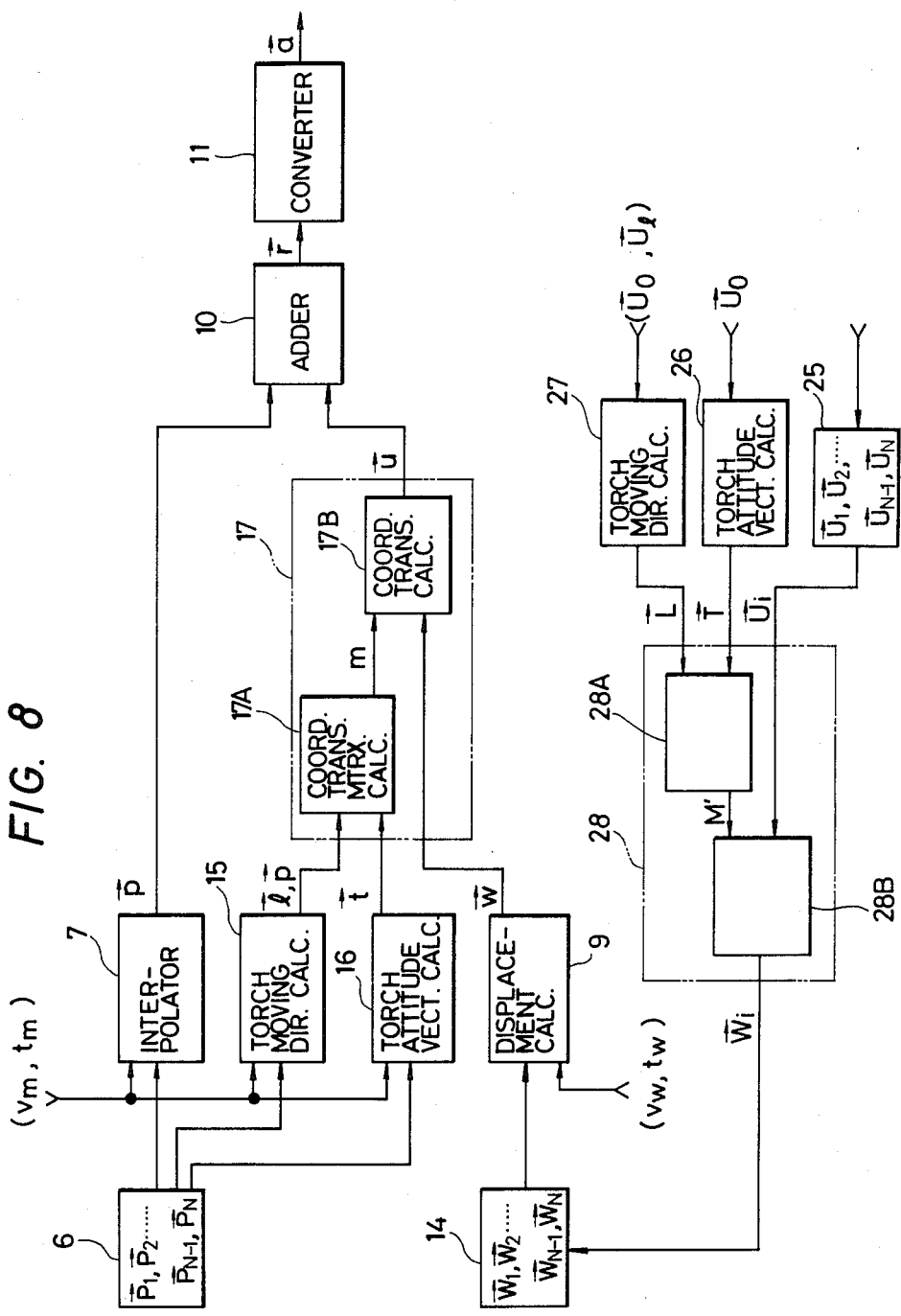
FIG. 8 is a block diagram of input/output portions of the system of FIG. 6.

The rotation and parallel shift operator 17 includes, as shown in FIG. 8, a coordinate transforming matrix calculator 17A and a coordinate transforming calculator 17B. The matrix calculator 17A, supplied with output signals from the direction vector calculator 15 and attitude vector calulator 16, produces a 4×4 transformation matrix m between an absolute coordinate system and a coordinate system having p as an origin, $\vec{l}$ being parallel to the x axis, and t being in the x-y plane, as shown in FIG. 7A. The coordinate transforming calculator 17B, supplied with m from the matrix operator 17A and a displacement $\vec{w}$ from the displacement operator 9, rotates and parallel-shifts the point w to the point p on the basis of $\vec{p}$, $\vec{1}$ and t by performing an operation of $\vec{w} \times m$.

The operations of the inventive system will be described with reference to FIGS. 6 and 7A through 7D.

In operation, it is assumed that weaving-like pattern information is stored in the pattern memory 14 in advance. Basically, the welding robot moves the torch between the starting point 1 and the terminating point 2 stored in the welding memory 6 as directed by the interpolator 7 so that the principle welding line 3 is followed. During this operation, the weaving-like pattern information stored in the pattern memory 14 is utilized so that a weaving-like movement 30 (FIGS. 7B and 7C) is performed. The weaving-like pattern is stored as coordinates relative to the reference point (x, y, z). Therefore, the weaving-like movement 30 around the principle welding line 3 and the orientation of the torch in the torch attitude direction 32 are performed by determining a torch plane axis 33 orthogonal to the torch moving direction vector 31 and an axis 34 which is orthogonal to the torch moving direction vector 31 and the torch plane axis 33 from the torch moving direction vector 31 and the torch attitude vector 32, rotating and parallel shifting the weaving-like pattern vector 20 with respect to the reference point as shown in FIG. 7B, and converting the result into an actuator output.

The teaching operation for storing the pattern information in the memory 14 will now be described.

The robot 12 is firstly moved by the teaching box 18 to an arbitrary position where the teaching of the weaving pattern is facilitated. At that position, various points of a desired weaving pattern are stored in the teaching pattern memory 25. This operation is the same as that used to teach the robot an ordinary welding line. FIG. 7D shows the pattern information taught.

Then, the position of the tip of the torch is moved to obtain the torch attitude vector. Since the torch itself takes the form of a straight rod, the torch attitude vector can be obtained from the tip position and inclination thereof. Then, the torch moving direction, namely, the starting point and the terminating point of the principle welding line, are taught to obtain the torch moving direction vector. The data used to teach the tip position for a preceding welding operation can be used as the starting point. Therefore, it may be enough to teach only the terminating point. With this data, vectors 32a and 31a can be obtained by using the torch attitude vector operator 26 and the torch moving direction vector operator 27, respectively.

The pattern information 20a in the teaching pattern memory 25 is stored in the pattern memory 14 after being converted by the rotation and parallel shift operator 28 into the coordinates of the reference point (x, y, z) according to the torch attitude vector 31a and the torch moving direction vector 32a. In this example, the weaving-like pattern vector 20 lies in the y-z plane. It should be noted, however, that the weaving pattern may take any value of x, y and z three-dimensionally.

The teaching operation is thus completed. The desired weaving-like motion along any principle welding line can be realized by obtaining the torch moving direction vector and the torch attitude vector with respect to the principle welding line again and rotating and parallel-shifting that information.

Returning to FIG. 8, the interpolator 7 and the operator 9 are used to obtain a point on the weaving-like pattern vector 20 and a point on the principle welding line 3 shown in FIG. 7A, in which $p_i$, p, $w_i$ and w are coordinate values of the robot in the absolute coordinate system. As shown in FIG. 7A, the weaving-like pattern is stored at a fixed position with a fixed direction in the absolute coordinate system. To the contrary, the direction 31 of the principle welding line and the torch attitude 32 depend upon a moving path. Therefore, it is necessary to rotate and parallel-shift those parameters and then obtain a composite vector thereof. In order to achieve this, a coordinate transforming matrix by which the moving direction 31 is made coincident with the torch attitude 32 is firstly obtained. That is, the pattern shown in FIG. 7B is obtained by the coordinate transformer 17B, and the weaving pattern 30 in FIG. 7C is obtained by the adder 10. The position vector r from the output of the adder 10 is converted by the converter 11 to an actuating input to the actuator, by which actual driving data a is obtained.

Describing the teaching of the weaving-like pattern, the pattern vector 20a and the respective vectors 31a and 32a of the moving direction and the torch attitude in FIG. 7D are stored. By obtaining the transforming matrix from making the vectors 31a and 32a coincident with the vectors 31 and 32 in FIG. 7B and rotating and parallel-shifting them, it becomes possible to properly orient them with respect to the principle welding line.

When the pattern vector 20a in FIG. 7D is rotated and parallel-shifted to a particular position in a particular direction in the absolute coordinate system, the pattern vector 20 in FIG. 7B can be obtained without using the vectors 31a and 32a in FIG. 7D. That is, a weaving-like pattern vector 20 (FIG. 7A) which is independent of the position and direction at the time of teaching can be obtained.

Although the present invention has been described with reference to the weaving-like movement of a welding robot, it can be applied to any robot such as a grinding robot or painting robot so long as such robot is to assume various tip positions and to move along a principle line while subordinately moving with certain patterns. Therefore, the weaving-like movement described herein should be interpreted as meaning any movement along a principle line with subordinate movement of a certain pattern which is substantially lateral with respect to the principle line. In the case of a grinding or painting robot, the torch attitude vector and the torch moving direction vector mentioned previously correspond to a hand attitude vector and a hand moving direction vector, respectively.

As described hereinbefore, according to the present invention, the reference weaving-like pattern stored as coordinate values of the reference point in the weaving-like pattern memory are rotated and parallel-shifted according to the hand attitude and the hand moving direction. Therefore, a single pattern can be applied to various principle paths, and thus the memory capacity can be reduced and the teaching process simplified.

Furthermore, according to the present invention, the weaving-like motion can be three-dimensional. That is, although in the conventional system shown in FIG. 2 only a two-dimensional weaving pattern can be taught, it is possible, according to the invention, to define and reproduce a three-dimensional pattern containing arbitrary number of points, including the arc interpolation as shown in FIG. 9. Further, the defects which are shown in FIG. 5 and which are inherent to the conventional system such as that disclosed in aforementioned U.S. Pat. No. 4,150,329 can be eliminated by the present invention by the employment of the rotation and parallel shift, resulting in the weaving-like pattern such as shown in FIG. 10.

I claim:

1. A teaching apparatus for an industrial robot having a hand adapted to work while moving along a principle line with subordinate movement with respect to the principle line, comprising:
   a teaching box for supplying an instruction to said hand to move said hand to an arbitrary position;
   a teaching pattern memory for storing actual pattern information of subordinate movement taught at said arbitrary position by said teaching box;
   a hand moving direction vector calculator for calculating a hand moving direction vector at said arbitrary position;
   a hand attitude vector calculator for calculating an attitude vector of said hand at said arbitrary position;
   a rotation and parallel shift calculator responsive to an output of said hand attitude vector calculator and said hand moving direction vector calculator to transform coordinates of said pattern information stored in said teaching pattern memory into coordinates in a predetermined reference coordinate system; and
   a weaving-like pattern memory for storing a pattern produced by said rotation and parallel shift calculator as a reference weaving-like pattern.

2. A teaching method for an industrial robot having a hand adapted to work while moving along a principle line with subordinate movement with respect to the principle line, comprising the steps of:
   teaching actual pattern information of subordinate moment of said hand at an arbitrary position and obtaining an attitude vector and a moving direction vector of said hand at said arbitrary position;
   transforming said actual pattern information into coordinates in a predetermined reference coordinate system using said attitude vector and said moving direction vector;
   storing said coordinates in said predetermined reference coordinate system as a reference subordinate movement pattern; and
   moving said hand according to said coordinates.

3. An apparatus for realizing a subordinate movement of a hand of an industrial robot, said hand being adapted to work while moving along a principle line, comprising:
   a weaving-like pattern memory for storing coordinates of weaving-like pattern in a predetermined reference coordinate system as reference weaving-like pattern information;
   a hand moving line memory for storing coordinates of a principle moving line of said hand;
   an interpolation calculator for interpolating said coordinates of said principle moving line stored in said hand moving line memory;
   a hand moving direction vector calculator for calculating a moving direction vector of said hand on the basis of said coordinates of said principle moving line stored in said hand moving line memory;
   a hand attitude vector calculator for calculating an attitude vector of said hand on the basis of said coordinates of said principle moving line stored in said hand moving line memory;
   a rotation and parallel-shift calculator for transforming said weaving-like pattern information in said weaving-like pattern memory into an actual displacement of said hand with respect to said principle moving direction on the basis of said moving direction vector from said hand moving direction vector calculator and said attitude vector from said hand attitude vector calculator;
   an adder for adding said actual displacement and an output of said interpolator; and
   an actuator output converter for converting an output of said adder into actual driving data, outputting said actual drawing data to said industrial robot, and providing a signal for controlling said hand.

4. A method for realizing a subordinate movement of a hand of an industrial robot with respect to a principle moving line thereof while working, comprising the steps of:
   storing weaving-like pattern information as coordinates of a predetermined reference coordinate system;
   transforming said weaving-like pattern information into an actual displacement with respect to an actual moving direction of said hand on the basis of a hand attitude vector and a hand moving direction vector; and
   moving said hand according to said actual displacement.

5. A method for realizing a subordinate movement of a hand of an industrial robot with respect to a principle moving line thereof while working, comprising the steps of:
   teaching actual weaving-like pattern information of said hand at an arbitrary position;
   transforming said weaving-like pattern information into coordinates of a predetermined reference coordinate system on the basis of an attitude vector and a moving direction vector of said hand at said position;
   storing said coordinates as a reference weaving pattern;
   transforming said reference weaving pattern into an actual displacement of said hand with respect to an actual moving direction of said hand on the basis of said attitude vector and said moving direction vector; and
   moving said hand on the basis of said actual displacement.

* * * * *